(12) United States Patent
Shibata et al.

(10) Patent No.: US 7,866,722 B2
(45) Date of Patent: Jan. 11, 2011

(54) CONSOLE BOX

(75) Inventors: Minoru Shibata, Aichi-ken (JP); Katsuhiro Katagiri, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 199 days.

(21) Appl. No.: 12/318,076

(22) Filed: Dec. 22, 2008

(65) Prior Publication Data
US 2009/0179449 A1 Jul. 16, 2009

(30) Foreign Application Priority Data
Jan. 15, 2008 (JP) .............................. 2008-005725

(51) Int. Cl.
*B60R 13/00* (2006.01)
(52) U.S. Cl. .................... 296/24.34; 296/37.1
(58) Field of Classification Search ............. 296/24.34, 296/37.1, 37.8, 308; 4/417; 428/83.95, 188, 428/304.4
See application file for complete search history.

(56) References Cited

U.S. PATENT DOCUMENTS

| | | | | |
|---|---|---|---|---|
| 5,897,155 A | * | 4/1999 | Kerner et al. ............... | 296/37.8 |
| 6,152,522 A | * | 11/2000 | Boulay et al. ............... | 296/208 |
| 6,231,098 B1 | * | 5/2001 | Schenk et al. ............... | 296/37.8 |
| 6,338,514 B1 | * | 1/2002 | Arold et al. ............... | 296/24.34 |
| 6,851,736 B1 | * | 2/2005 | Klopp et al. ............... | 296/37.8 |

FOREIGN PATENT DOCUMENTS

| | | |
|---|---|---|
| JP | A-08-295123 | 11/1996 |
| JP | A-2004-210006 | 7/2004 |
| JP | A-2005-59815 | 3/2005 |

* cited by examiner

*Primary Examiner*—Lori L Lyjak
(74) *Attorney, Agent, or Firm*—Posz Law Group, PLC

(57) ABSTRACT

It is to provide a console box, in which a ventilation duct is integrated with the console box without using a slide core, thus suppressing the increase of costs and preventing dew formation in a box body. A vertical wall protrudes downwards from the lower plate of the box body in such a way as to extend in the longitudinal direction of the console box, and a horizontal wall is integrally provided on a lower end of the vertical wall in such a way as to protrude to at least one of left and right sides and extend in the longitudinal direction of the console box. A ventilation duct is defined by the lower plate, the vertical wall, the horizontal wall, and each of the side panels. The console box includes the box body and a pair of left and right side panels, thus allowing the ventilation duct to be easily integrated with the lower portion of the box body without using the slide core. Also, dew is not formed on a wall surface of a storage space.

5 Claims, 7 Drawing Sheets

CONSOLE BOX

INCORPORATION BY REFERENCE

This disclosure of Japanese Patent Application No. 2008-005725 filed on Jan. 15, 2008, including the specification, drawings, and abstract is incorporated by reference in its entirety.

BACKGROUND OF THE INVENTION

1. Field of the Invention

The present invention relates to a console box provided in the interior of a vehicle.

2. Description of the Related Art

A console box which is provided between a driver's seat and a front passenger seat of a vehicle is used as a storage compartment for storing compact discs and others. Furthermore, a console lid for opening or closing the upper opening of the console box is frequently used as an armrest. In addition, a console box having an air conditioning register on the rear portion of the console box is familiar. This console box blows air for air-conditioning towards a rear seat, thus allowing passengers sitting on the rear seat to feel comfortable.

For example, Japanese Patent Laid-Open Publication No. 08-295123 and Japanese Patent Laid-Open Publication No. 2004-210006 disclosed a structure having an additional ventilation duct on the lower surface of a console box. However, when the ventilation duct is placed on the lower surface of the console box, the depth of the lower portion of an article storage part in the console box is inevitably limited.

Here, Japanese Patent Laid-Open Publication No. 2005-059815 disclosed a floor console having a ventilation duct in the sidewall of the console box and the inner wall of an article storage part. The ventilation duct is formed on the side surface, thus ensuring a sufficient depth for the article storage part.

However, when the ventilation duct is formed on the side surface of the article storage part, dew may form on the inner wall of the article storage part because of cold air which flows through the ventilation duct. In order to solve the problem, according to Japanese Patent Laid-Open Publication No. 2005-059815, foam material is attached to the sidewall of the console box and the inner wall of the article storage part, thus providing a heat insulation.

However, the structure to which the foam material is attached is problematic in that the number of parts has increased, which increases costs. The structure having the additional ventilation duct on the lower portion of the console box is also problematic in that dew forms on the lower surface of the article storage part. However, the formation of the dew can be avoided only by laying a carpet on the lower surface of the article storage part. Laying carpet has usually been conducted. However, the additional ventilation duct undesirably leads to an increase in the number of parts.

Therefore, a console box with which the ventilation duct is integrated has been considered. As shown in FIG. 7, a console box is constructed so that a sidewall 101 and a box body 100 are integrated into a single structure. If a ventilation duct 200 is formed integrally on the lower surface of the console box, a slide core is required. Thus, the cost of a mold is increased and man-hours are increased.

Furthermore, when the console box is formed as shown in FIG. 7, gradients are required for the box body 100 and both sides of the sidewall 101 so as to remove a mold. For this reason, the volume of the article storage part becomes limited because of the limiting condition imposed on the entire width dimension.

SUMMARY OF THE INVENTION

Accordingly, the present invention has been made keeping in mind the above problems occurring in the prior art, and the present invention is to provide a console box, in which a ventilation duct is integrated with the console box without using a slide core, thus suppressing the increase of costs and preventing dew formation in a box body.

A console box in accordance with the present invention includes a box body having a shape of a box; a pair of left and right side panels placed outside left and right walls of the box body, and secured to the box body when a longitudinal direction and a lateral direction of a vehicle are designated as a longitudinal direction and a lateral direction of the console box; and a heat insulating member having heat insulating ability, provided on a surface of a lower plate of the box body, wherein a vertical wall protrudes downwards from the lower plate of the box body in such a way as to extend in the longitudinal direction of the console box, and a horizontal wall is integrally provided on a lower end of the vertical wall in such a way as to protrude to at least one of left and right sides and extend in the longitudinal direction of the console box, and a ventilation duct is defined by the lower plate, the vertical wall, the horizontal wall and the side panels.

It is preferable that the vertical wall and the horizontal wall are provided on each of left and right sides of the lower plate of the box body, thus providing a pair of left and right ventilation ducts.

Also, it is preferable that a rib protrudes from the lower plate of the box body in such a way as to be parallel to the horizontal wall and extend in the longitudinal direction of the console box, and each of the rib and the horizontal wall is welded at an end thereof to an associated side panel.

The console box of the present invention includes a box body and a pair of left and right side panels, thus allowing a vertical wall and a horizontal wall to be easily integrated with the lower portion of the box body without using the slide core. Thus, the increase of costs can be suppressed, yielding an inexpensive console box.

Furthermore, the ventilation duct is defined by a space enclosed by a lower plate, the vertical wall, the horizontal wall, and the side panels, so that visible portions in which dew may form make up a surface of the lower plate of the box body and the lower surfaces of the side panels. Since a heat insulating member is provided on the surface of the lower plate of the box body, the formation of dew is prevented by the heat insulating operation of the heat insulating member. In addition, since the lower surface of each side panel is covered with a front seat covering or a floor mat, special measures for preventing dew are not required.

There may be only one ventilation duct. However, the vertical wall and the horizontal wall are preferably formed on each of the left and right sides of the lower plate of the box body, so that a pair of ventilation ducts is formed on the left and right sides. Such a construction allows air for air-conditioning to be evenly supplied from the left and right sides to a rear seat, thus improving comfort.

Furthermore, a rib protrudes from the lower plate of the box body in such a way as to be parallel to the horizontal wall and extend in the longitudinal direction of the console box. The leading ends of the rib and the horizontal wall are welded to each side panel, thus more reliably preventing dew from being formed in the article storage part.

Moreover, in the console box of the present invention, the sidewall of the box body requires a predetermined gradient so as to remove a mold, but each side panel can be placed perpendicular to a floor of a vehicle body. Therefore, the dimension of the article storage part in the lateral direction is larger than that of the conventional console box shown in FIG. 7. This compensates for a depth dimension being reduced because of the formation of a ventilation duct in the lower portion of the box body, and ensuring sufficient storage space.

BRIEF DESCRIPTION OF THE DRAWINGS

The above and other objects and features of the present invention will become apparent from the following description of specified embodiments, given in conjunction with the accompanying drawings, in which.

DESCRIPTION OF THE SPECIFIC EMBODIMENTS

Figure 1:
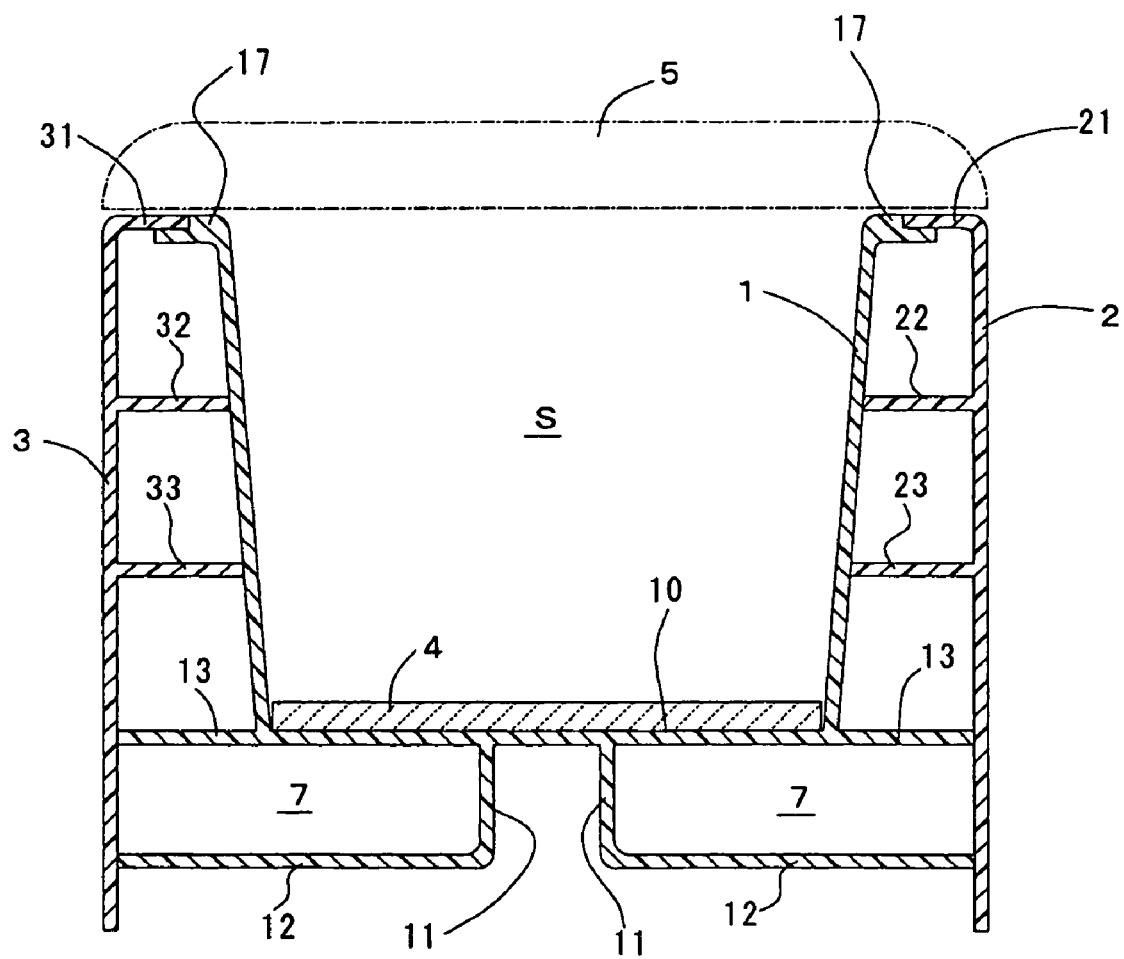
FIG. 1 is a sectional view illustrating a console box according to the first embodiment of the present invention.

Various embodiments of the present invention will now be described in detail with reference to the accompanying drawings.

A console box of the present invention includes a box body and a pair of left and right side panels. The left and right side panels form the left and right sides of the console box, and have a height reaching from the upper end of the console box to a floor of a vehicle body. The box body and the side panels may be fastened to each other using screws, or may be joined together by welding.

The box body has the shape of a box which has a lower plate and four side plates. A vertical wall and a horizontal wall are integrated with the lower plate of the box body. The vertical wall protrudes downwards in such a way as to extend in the longitudinal direction of the console box. The horizontal wall protrudes from the leading end of the vertical wall to at least one of the left and right sides in such a way as to extend in the longitudinal direction of the console box. That is, the lower plate of the box body, the vertical wall, and the horizontal wall define a ⊐-shaped cross section. Space which is enclosed by the lower plate, the vertical wall, the horizontal wall and the side panel defines a ventilation duct. Thus, it is preferable that there be no gap between the leading end of the horizontal wall and the side panel. It is also preferable that the horizontal wall and the side panel be air-tightly welded or adhered together.

If a gap exists between the lower plate of the box body and the side panel, the left or right side plate of the box body is cooled by cold air passing through the ventilation duct, so that dew may be formed on the inner surface of the side plate. Thus, a rib protrudes from the lower plate of the box body to be parallel to the horizontal wall, and extends in the longitudinal direction of the console box. Preferably, the leading end of the rib and the horizontal wall are welded or adhered to the side panel.

Furthermore, an opening is formed in at least one of a pair of left and right side plates which face each other, among the four side plates of the box body. In this case, a surface of the side panel in the opening becomes a wall surface for defining an article storage part, thus increasing the dimension of the article storage part in the lateral direction and thereby increasing storage capacity.

Since a heat insulating member has heat insulating ability, the heat insulating member may be made of foam, non-woven fabric, etc. A carpet manufactured separately from the box body may be laid on the floor of the box body. Furthermore, the heat insulating member may be integrated with the box body by foaming the lower plate of the box body.

According to the prior art, in order to secure the console box to the vehicle body, the lower plate of the box body is secured to the floor of the vehicle body. However, since the console box of the present invention has a ventilation duct, it may be difficult to mount the lower plate of the box body to the floor of the vehicle body. Preferably, a mounting bracket protrudes from the horizontal wall. Such a construction allows the mounting bracket to be secured to the floor of the vehicle body from the exterior of the console box.

Furthermore, if a pair of horizontal walls is provided on the left and right sides of the console box, a pair of left and right mounting brackets will be provided. This construction improves mounting strength and stability.

EMBODIMENTS

Hereinafter, embodiments and comparative examples of the present invention will be described in detail.

First Embodiment

Figure 2:
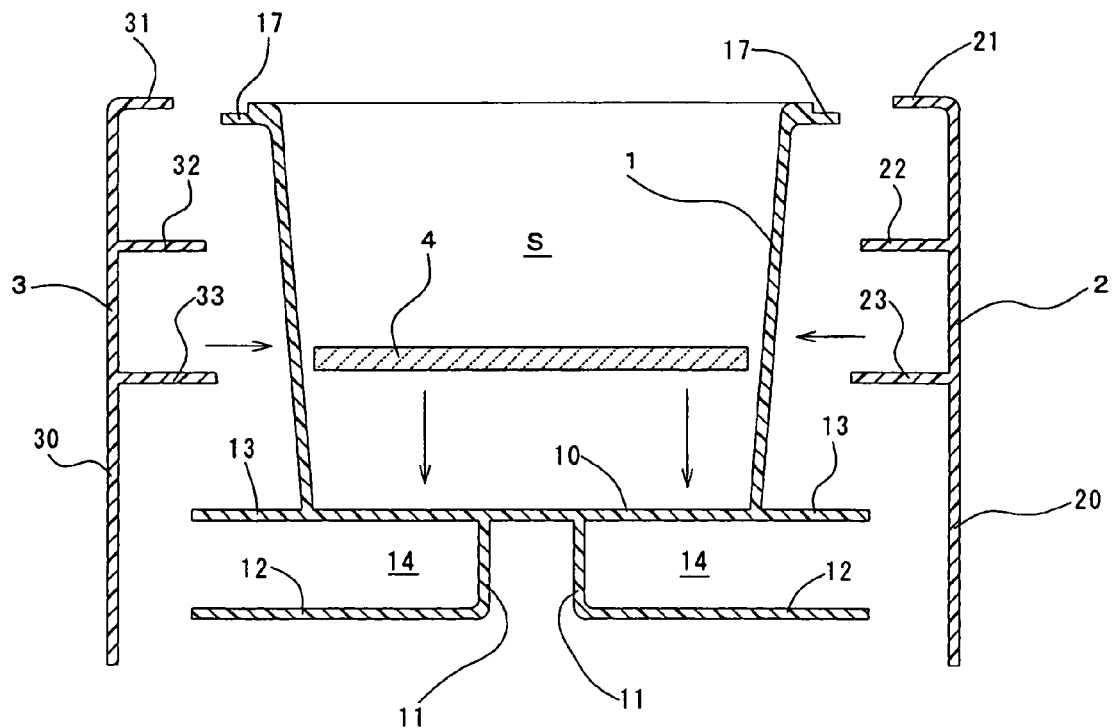
FIG. 2 is an exploded sectional view illustrating the construction of parts of the console box according to the first embodiment of the present invention.
Figure 3:
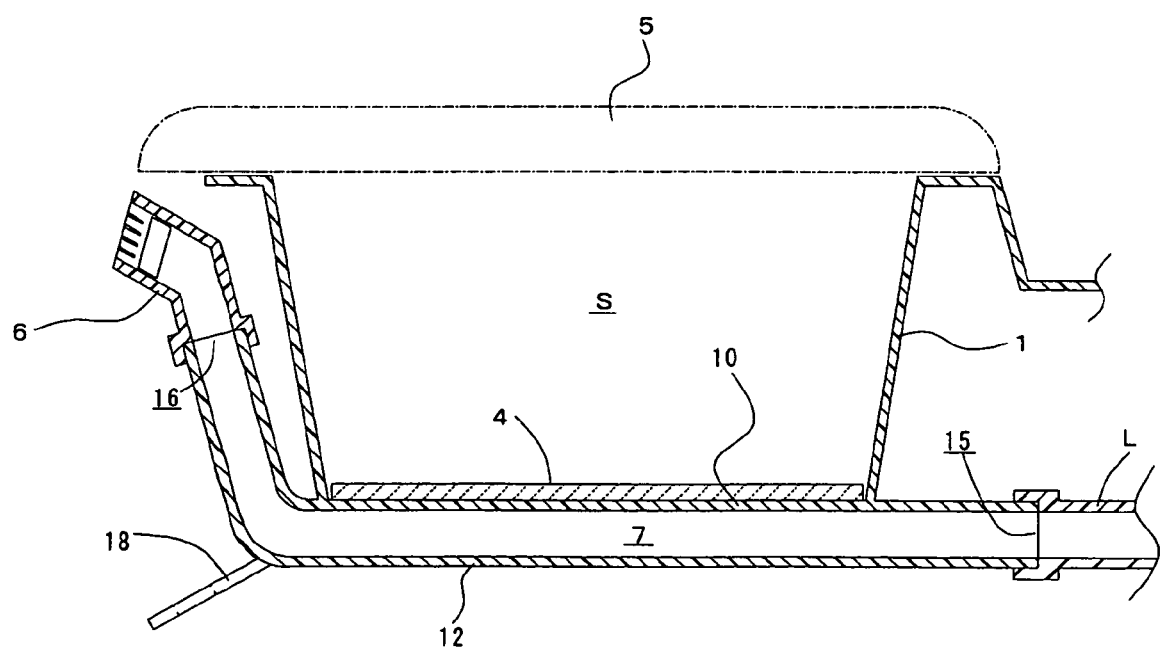
FIG. 3 is a sectional view illustrating the console box according to the first embodiment of the present invention.
Figure 4:
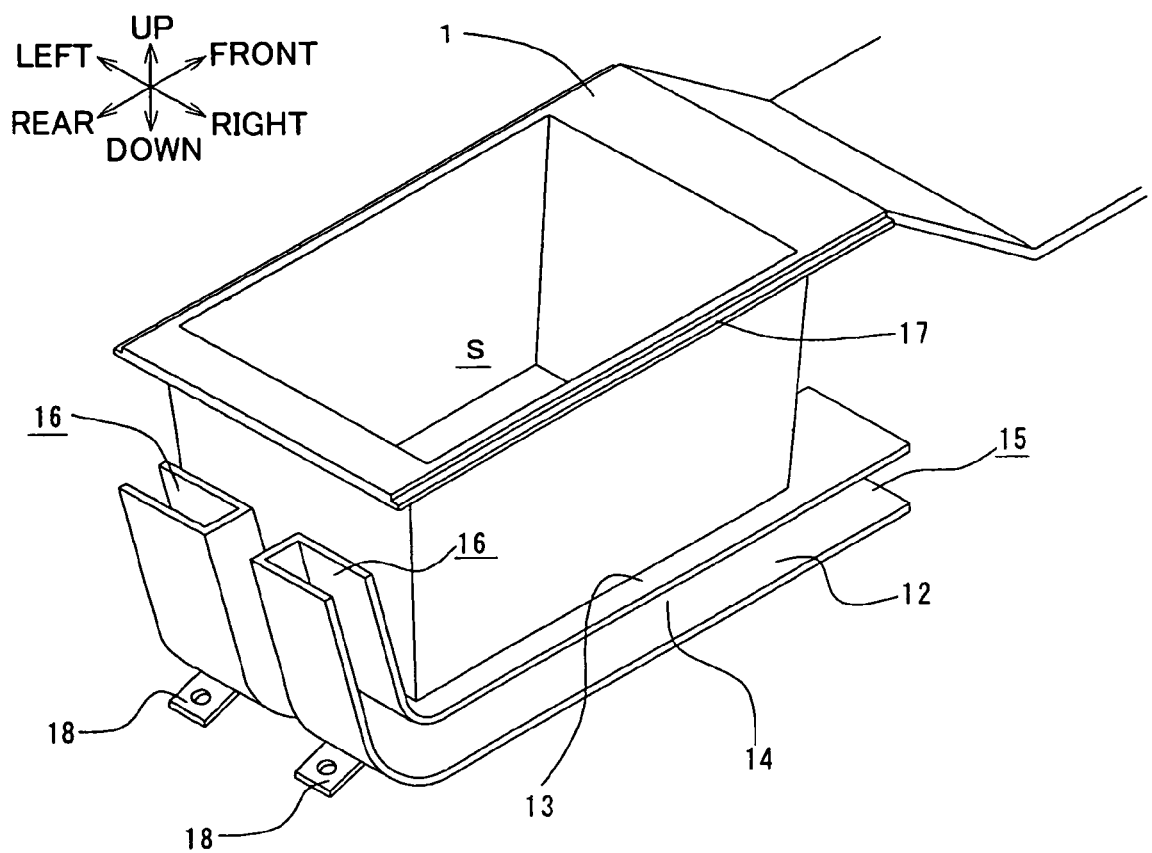
FIG. 4 is a perspective view illustrating a box body of the console box according to the first embodiment of the present invention.
Figure 5:
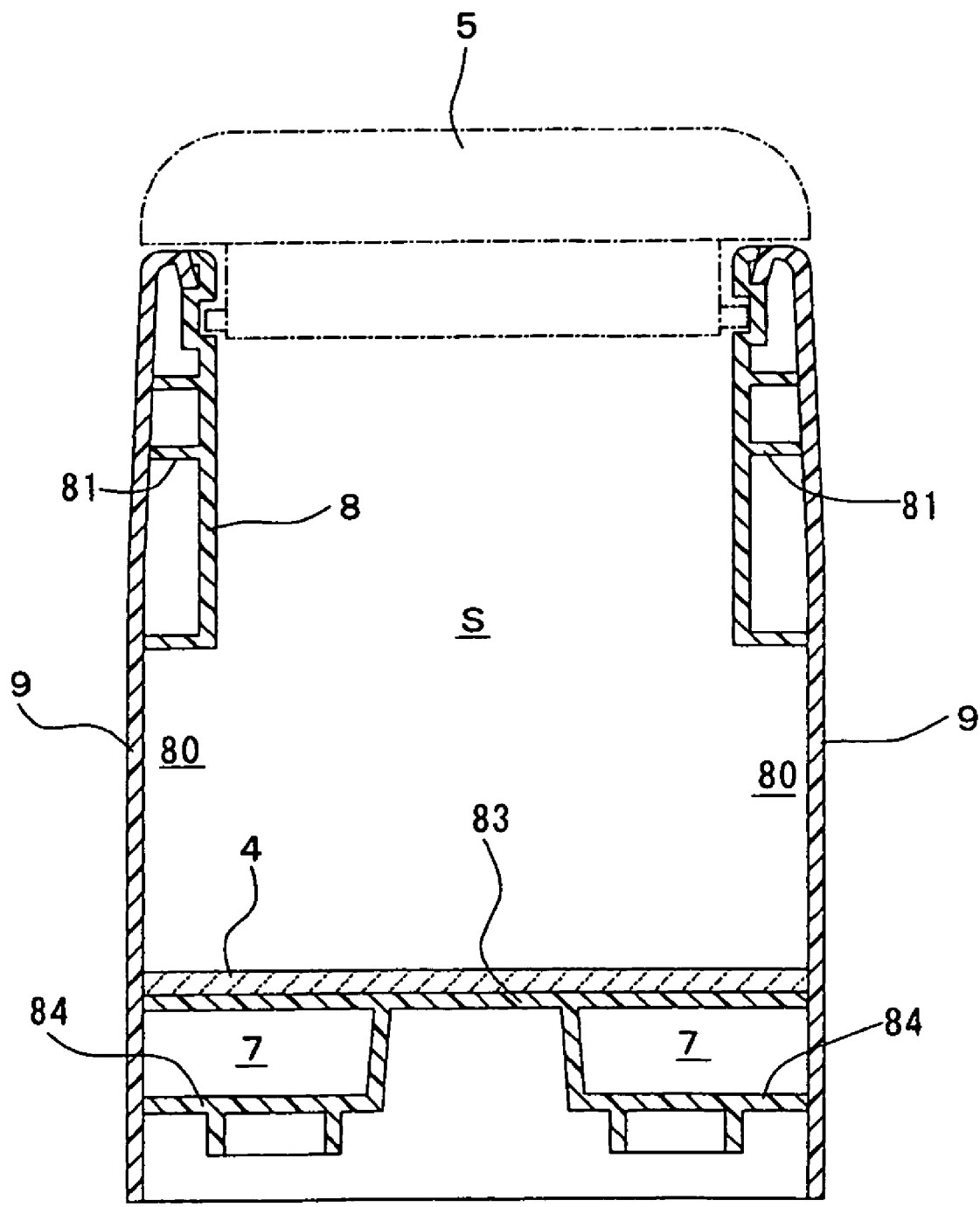
FIG. 5 is a sectional view illustrating a console box according to the second embodiment of the present invention.

FIG. 1 is a vertical sectional view illustrating a console box of the present invention taken in a lateral direction, FIG. 2 is a sectional view illustrating the construction of parts of the console box, and FIG. 3 is a vertical sectional view of the console box taken in a longitudinal direction. Furthermore, FIG. 4 is a perspective view illustrating a box body.

The console box includes a box body 1 having storage space S, right and left side panels 2 and 3, which are respectively welded to right and left side plates, of the box body 1. A carpet 4 which is made of a non-woven fabric and serves as a heat insulating member is attached to a surface of a lower plate 10 of the box body 1. Furthermore, a lid 5 is provided on the opening of the storage space S in such a way as to open or close the storage space S. Moreover, a pair of rear registers 6 is placed, respectively, on the left and right sides behind the box body 1.

The box body 1 made of a resin material is fabricated to have the shape of a box having the storage space S. A pair of vertical walls 11 protrudes downwards from the lower plate 10 in such a way as to extend in the longitudinal direction of the console box. A horizontal wall 12 protrudes outwards from the lower end of each vertical wall 11 to the left or right, in such a way as to extend in the longitudinal direction of the console box along with the vertical wall 11.

Furthermore, box-side ribs 13 protrude outwards from the left and right side plates of the box body 1 in such a way as to correspond to the lower plate 10 and extend in the longitudinal direction of the console box. That is, a groove 14 having a ⊐-shaped cross section is formed by the lower plate 10, each vertical wall 11, each horizontal wall 12, and each box-side rib 13. As shown in FIGS. 3 and 4, the vertical walls 11, the horizontal walls 12, and the box-side ribs 13 protrude forwards from the storage space S at the front of the box body 1. So a front opening 15 of each groove 14 opens forwards. Furthermore, the vertical walls 11, the horizontal walls 12 and the box-side ribs 13 are bent upwards at the rear of the box body 1. Therefore a rear opening 16 of each groove 14 opens obliquely upwards.

Furthermore, flanges 17 protrude outwards from the left and right sides of the upper opening of the storage space S of the box body 1. Moreover, mounting brackets 18 are provided on the pair of horizontal walls 12, in such a way as to protrude rearwards from the box body 1.

The size of the right side panel 2 and the left side panel 3, which are made of the same resin as the box body 1, is designed so that they completely cover the left and right side plates of the box body 1. That is, the right side panel 2 includes a panel part 20, a first rib 21, a second rib 22, and a third rib 23, while the left side panel 3 includes a panel part 30, a first rib 31, a second rib 32, and a third rib 33. The first rib 21 or 31 protrudes inwards from the upper end of the panel part 20 or 30 in such a way as to extend in the longitudinal direction. The second and third ribs 22 and 23 or 32 and 33 protrude inwards from the inner surface of the panel part 20 or 30 in such a way as to be parallel to the first rib 21 or 31.

The right side panel 2 and the left side panel 3 are welded to the box body 1. That is, the first ribs 21 and 31 are welded to the flanges 17. The second ribs 22 and 32 and the third ribs 23 and 33 are welded at leading ends thereof to the outer surfaces of the left and right side plates of the box body 1. Furthermore, leading ends of the horizontal walls 12 and the box-side ribs 13, provided on left and right sides of the console box, are welded to the inner surfaces of the panel parts 20 and 30. Thereby, the left and right openings of the pair of grooves 14 which are defined by the lower plate 10, the vertical walls 11, the horizontal walls 12, and the box-side rib 13 are closed by the corresponding panel parts 20 and 30, thus creating ventilation ducts 7 which are closed spaces surrounded by the lower plate 10, the vertical walls 11, the horizontal walls 12, the box-side ribs 13, and the panel parts 20 and 30.

A lid 5 may be attached to an integrated product having the box body 1, the right side panel 2, and the left side panel 3, in such a way as to open or close the upper opening of the storage space S. Furthermore, the carpet 4 is laid on the surface of the lower plate 10. Also, the register 6 may be attached to the rear opening 16 of each groove 14.

In the console box according to this embodiment constructed as described above, the mounting brackets 18 are secured to the floor of the vehicle body by bolts (not shown). Moreover, a duct L which delivers air from an air conditioning apparatus may be attached to the front opening 15 of each groove 14. Thus, cold or hot air is supplied from the air conditioning apparatus through the duct L to each ventilation duct 7. Thereafter the air is blown through the register 6 to the rear seat.

Here, in the case where cold air is supplied from the air conditioning apparatus, the lower plate 10, the vertical wall 11, the horizontal wall 12, the box-side rib 13, and the panel part 20 or 30 defining each ventilation duct 7 are cooled, so that dew may form. Here, among surfaces of the lower plate 10, the vertical walls 11, the horizontal walls 12, the box-side ribs 13, and the panel parts 20 and 30, dew formed on the surface of the lower plate 10 causes a big problem. However, the carpet 4 which has heat insulating ability is laid on the surface of the lower plate 10 to prevent the formation of dew. Meanwhile, even if dew forms on a portion opposite the ventilation duct 7 of each panel part 20 or 30, the portion is covered by a front seat covering or a floor mat, and thus the dew does not cause any problems.

Furthermore, in the console box of this embodiment, the box body 1 and the right and left side panels 2 and 3 can be easily manufactured without using a slide core. As the box body 1 is welded to the right side panel 2 and the left side panel 3, the ventilation ducts 7 are created. Consequently, an inexpensive console box is obtained.

Second Embodiment

Figure 6:
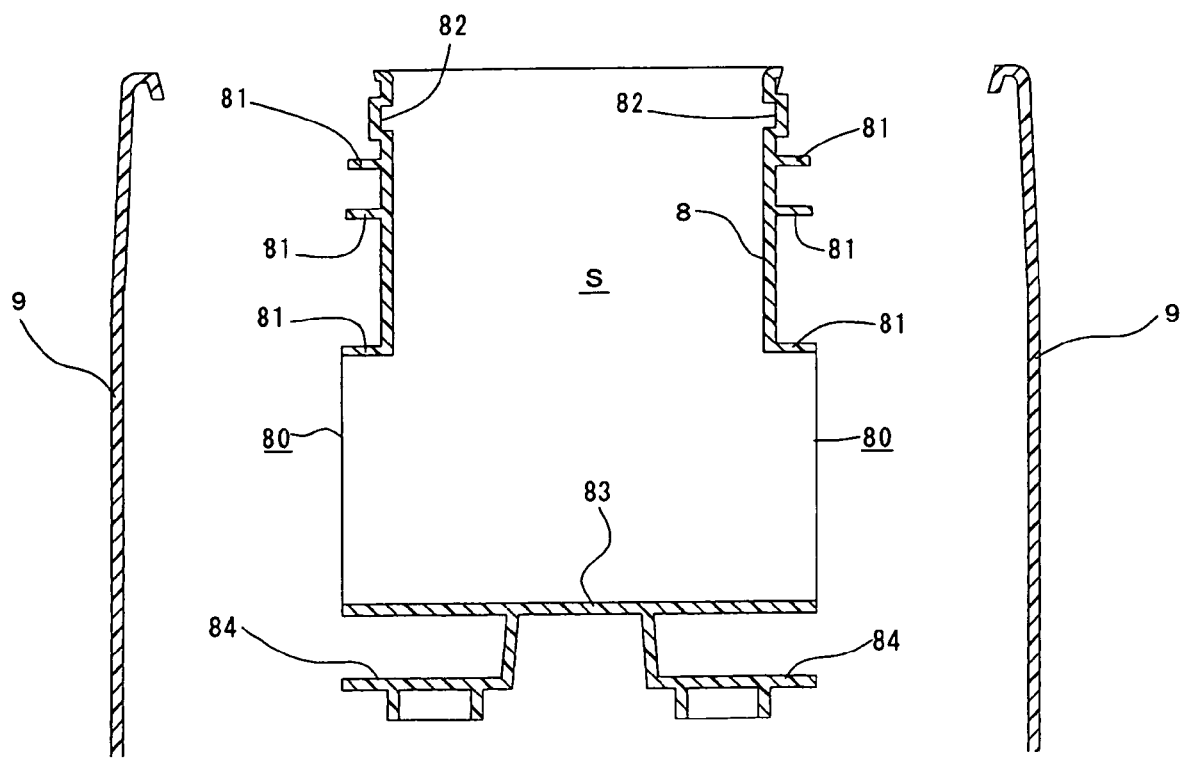
FIG. 6 is an exploded sectional view illustrating the construction of parts of the console box according to the second embodiment of the present invention.
Figure 7:
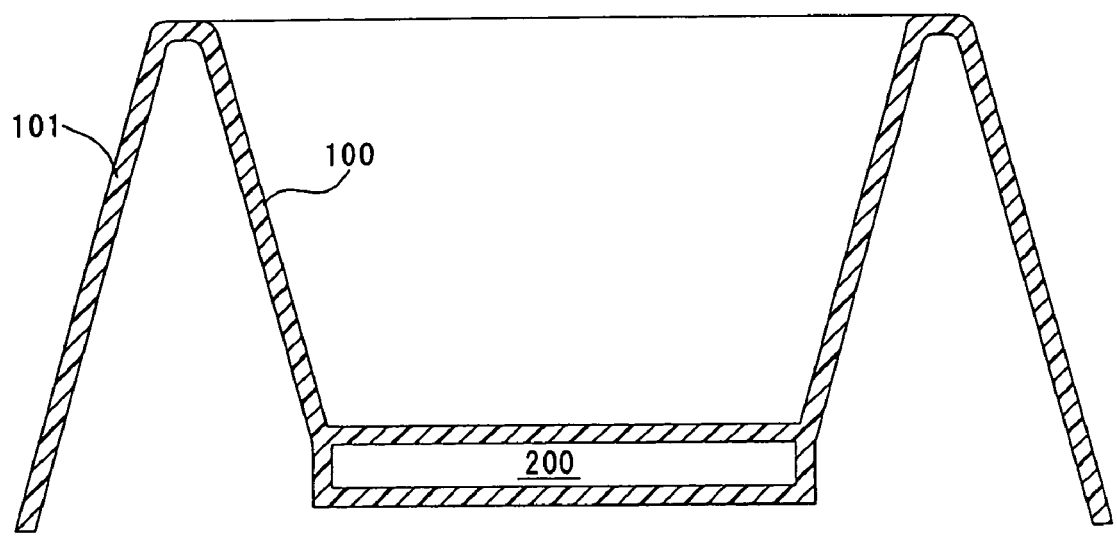
FIG. 7 is a sectional view illustrating a conventional console box.

FIG. 6 is a sectional view illustrating a console box according to this embodiment before a welding operation is performed. Similarly to the first embodiment, the console box is constructed so that a pair of side panels 9 is welded to a box body 8.

An opening 80 is formed in each of left and right side plates of the box body 8. Moreover, a plurality of ribs 81 protrudes outwards from each of the left and right side plates in such a way as to be positioned above the associated opening 80 and extend in the longitudinal direction of the console box. In addition, guide grooves 82 are formed in the inner walls of the upper portions of the left and right side plates so that the lid 5 slides forwards and backwards along the guide grooves 82. Meanwhile, each of the left and right side panels 9 has the shape of a flat plate having no rib.

Furthermore, leading ends of the ribs 81 of the box body 8, ends of a lower plate 83, and leading ends of horizontal walls 84 constructed as in the first embodiment are welded to the left and right side panels 9, so that the box body 8 and the pair of side panels 9 are integrated into a single structure. The remaining construction of the second embodiment is equal to the first embodiment.

That is, the console box according to this embodiment is constructed so that the box body 8 and a pair of side panels 9 are welded to each other, thus forming the ventilation ducts 7, as in the first embodiment 1. Therefore, as in the first embodiment, the formation of dew in the storage space S can be prevented, and the console box can be manufactured at low costs. Moreover, the side panels 9 define the left and right walls of the storage space S by the openings 80, so that the dimension of the storage space S in the lateral direction is increased compared to the first embodiment and thus the capacity of the console box is increased.

While the invention has been shown and described with respect to the preferred embodiments, it will be understood by those skilled in the art that various changes and modification may be made without departing from the spirit and scope of the invention as defined in the following claims.

What is claimed is:

1. A console box, comprising:

a box body having a shape of a box;

a pair of left and right side panels placed outside left and right walls of the box body, and secured to the box body when a longitudinal direction and a lateral direction of a vehicle are designated as a longitudinal direction and a lateral direction of the console box; and a heat insulating member having heat insulating ability, provided on a surface of a lower plate of the box body, wherein a vertical wall protrudes downwards from the lower plate of the box body in such a way as to extend in the longitudinal direction of the console box, and a horizontal wall is integrally provided on a lower end of the vertical wall in such a way as to protrude to at least one of left and right sides and extend in the longitudinal direction of the console box, and a ventilation duct is defined by the lower plate, the vertical wall, the horizontal wall and the side panels.

2. The console box as set forth in claim 1, wherein the heat insulating member is a carpet.

3. The console box as set forth in claim 1, wherein the vertical wall and the horizontal wall are provided on each of left and right sides of the lower plate of the box body, thus providing a pair of left and right ventilation ducts.

4. The console box as set forth in claim 1, wherein a rib protrudes from the lower plate of the box body in such a way as to be parallel to the horizontal wall and extend in the longitudinal direction of the console box; and each of the rib and the horizontal wall is welded at an end thereof to an associated side panel.

5. The console box as set forth in claim 1, wherein a mounting bracket is provided on the horizontal wall to mount the console box to a vehicle body.

\* \* \* \* \*